United States Patent
Henke et al.

(10) Patent No.: US 7,577,937 B2
(45) Date of Patent: Aug. 18, 2009

(54) METHODS AND SYSTEMS FOR GENERATING A CONFIGURABLE USER INTERFACE

(75) Inventors: Andreas Henke, Nussloch (DE); Riuparna Sengupta, Karlsruhe (DE)

(73) Assignee: SAP AG, Walldorf (DE)

( * ) Notice: Subject to any disclaimer, the term of this patent is extended or adjusted under 35 U.S.C. 154(b) by 622 days.

(21) Appl. No.: 11/084,029

(22) Filed: Mar. 21, 2005

(65) Prior Publication Data

US 2005/0251788 A1 Nov. 10, 2005

(30) Foreign Application Priority Data

Mar. 31, 2004 (EP) ................... 04076030

(51) Int. Cl.
G06F 9/44 (2006.01)
G06F 3/00 (2006.01)

(52) U.S. Cl. ................. 717/110; 715/700; 715/744; 715/762

(58) Field of Classification Search ........... 717/109, 717/110; 715/765, 700, 744, 762
See application file for complete search history.

(56) References Cited

U.S. PATENT DOCUMENTS

| | | | | |
|---|---|---|---|---|
| 5,774,357 A | * | 6/1998 | Hoffberg et al. ........... 713/600 |
| 6,590,589 B1 | * | 7/2003 | Sluiman et al. ........... 715/751 |
| 6,734,879 B2 | * | 5/2004 | Hasha et al. ............. 715/737 |
| 6,826,540 B1 | * | 11/2004 | Plantec et al. ............ 705/10 |
| 6,883,144 B2 | * | 4/2005 | Zielinski et al. .......... 715/765 |
| 7,263,663 B2 | * | 8/2007 | Ballard et al. ............ 715/762 |
| 2004/0085457 A1 | * | 5/2004 | Thorland et al. ......... 348/220.1 |
| 2004/0153992 A1 | * | 8/2004 | Molina-Moreno et al. .. 717/105 |
| 2005/0246645 A1 | * | 11/2005 | Beam et al. ............. 715/747 |
| 2007/0180432 A1 | * | 8/2007 | Gassner et al. ........... 717/136 |

FOREIGN PATENT DOCUMENTS

WO WO/2005/111985 * 7/2004

* cited by examiner

*Primary Examiner*—Wei Y Zhen
*Assistant Examiner*—Chih-Ching Chow
(74) *Attorney, Agent, or Firm*—Finnegan, Henderson, Farabow, Garrett & Dunner, LLP

(57) ABSTRACT

Systems and methods consistent with embodiments of the present invention generate a user interface for a computer system. As disclosed herein, a generating tool may be used to generate the user interface using metadata of a predetermined format. The generating tool is programmed to dynamically create the metadata of the predetermined format. Metadata of the predetermined format may be provided in the form of semi-configured screens, which define user interface container elements that are configurable by the dynamically created metadata so as to define a form/location or context.

15 Claims, 4 Drawing Sheets

Submit Idea

☐ Title *
☐ Protection Level ▶
☐ Author Sengupta, Rituparna ⊙ ...
☐ Source ▶

Description
☐ Created At

Attachment
Add...
Name                                      Remove
                    0-0/0
⊠ ◁ ▷ ⊠

Classification
Edit...
                                          Remove
                    0-0/0
⊠ ◁ ▷ ⊠

Submit   Cancel

Figure 4

METHODS AND SYSTEMS FOR GENERATING A CONFIGURABLE USER INTERFACE

BACKGROUND

I. Technical Field

The present invention generally relates to methods and systems for generating a user interface in a computer system.

II. Background Information

Today's computer end users are accustomed to the Internet's intuitive point-and-click technology. Yet in contrast to many professional business applications, Internet browsers often lack input checks, input help, support for multiple languages, and easy-to-use error handling functionality. These shortcomings are typically not acceptable for state-of-the-art Web applications.

To implement required functionality, software development companies have developed software that provides a design time environment that is independent of the underlying runtime environment and enables companies to model and design user interfaces cost-effectively and precisely. For example, SAP AG (Walldorf, Germany) has launched Web-Dynpro as a powerful tool to create user interfaces that are fully in compliance with the above-identified requirements for usability and user friendliness.

However, in the process of developing and implementing a business tool, it has been found that the conventional approach of designing, developing, and implementing a user interface has shortcomings, since it poses a quite rigid context on the side of the end user. Since an application developer knows the business applications are needed for software, the developer knows the sections of the application that should appear in the user interface and can decide where to display data sources. In this respect, a pattern based user interface (UI) has become popular. Pattern based UIs are predefined UI layouts that are available centrally to several applications and may be configured for use by several applications. Pattern based UIs do not require programming, but are restricted in the functionality provided by the pattern, which may cause a loss of flexibility and functionality. Once implemented in a company, one should have the flexibility to decide the data that should be displayed, and customize or adapt the user interfaces for the business to better meet needs and rid superfluous elements that are unnecessary to present to a user.

SUMMARY

Consistent with embodiments of the present invention, a method is provided for generating a user interface for a computer system. The method comprises providing a generating tool for generating a user interface to the computer system using metadata of a predetermined format, and programming the generating tool to dynamically create the metadata of the predetermined format.

Also, consistent with embodiments of the present invention, a computer system is provided that comprises a processor, a generating tool configured to run on the processor for generating a user interface to the computer system, a repository comprising metadata of a predetermined format that is used by the generating tool, and a configuration tool for dynamically creating the metadata of the predetermined format that is used by the generating tool.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings:

FIG. 4 shows an exemplary user interface that has been fully configured, consistent with an embodiment of the present invention.

DETAILED DESCRIPTION

Figure 1:
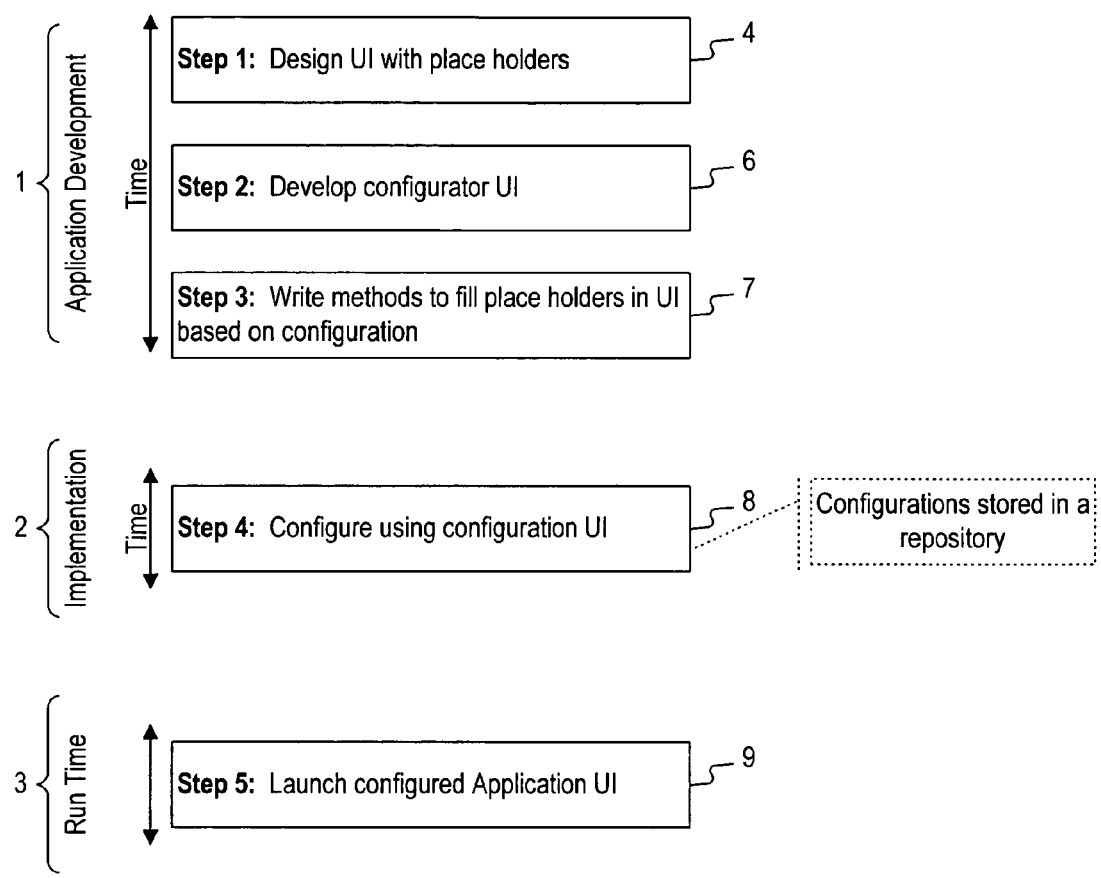
FIG. 1 shows a flow chart of an exemplary method for generating a user interface, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Embodiments consistent with the present invention provide an environment, where, at implementation time, a consultant or end user may make a layout change of a user interface. Other embodiments consistent with the present invention provide a software tool that includes usability and flexibility features for modifying a user interface after implementing a business program. For example, by soft-coding data to be displayed, in implementation time at a customer site, the customer may configure the fields to be displayed. At runtime, this information is mapped to containers in the user interface and the user interface is generated.

The steps of the exemplary method illustrated in FIG. 1 are divided into an application development stage 1, an implementation stage 2, and a runtime stage 3 to discriminate between the various phases of the installation of an application (such as a business software program) in a company.

During the application development stage 1, the most flexibility may be offered for configuring the user interface. To provide at implementation time 2 the same amount of flexibility, methods consistent with embodiments of the present invention may generate a user interface for a computer system. In one embodiment, a generating tool generates a user interface using metadata of a predetermined format and is programmed to dynamically create the metadata. Accordingly, in application development time, as will be shown with reference to FIG. 2, a semi-configured screen for generating a user interface is not hard coded, but includes elements that are dynamically configurable.

As a first step 4, a semi-configured screen is designed for the user interface with containers 5. These elements 5 (see, e.g., FIG. 2) indicate a graphical function and do not provide specific details for form/location and/or context for a plurality of user interface control elements. These details may be filled in later, in implementation time 2, so that the user interface control elements are configured by the dynamically created metadata to define the form/location and/or context of the interface control elements. Another step 6 in application development time 1, is the development of a configurator user interface tool, which generates a user interface to a computer system using metadata of a predetermined format. Additionally, in application development time, methods are defined in another step 7 to fill the containers in the user interface using the dynamically created metadata.

When steps 4, 6, and 7 are performed, the application is prepared for the interface to be configured in implementation step 8. At this time, the software is fully developed and no programming is necessary. However, a consultant or end user that would like to modify or adapt some elements in the user interface is able to dynamically create the metadata in the predetermined format using the methods created in application development step 7. Finally, in step 9, the application is ready to be launched to display the specially configured interface.

Figure 2:
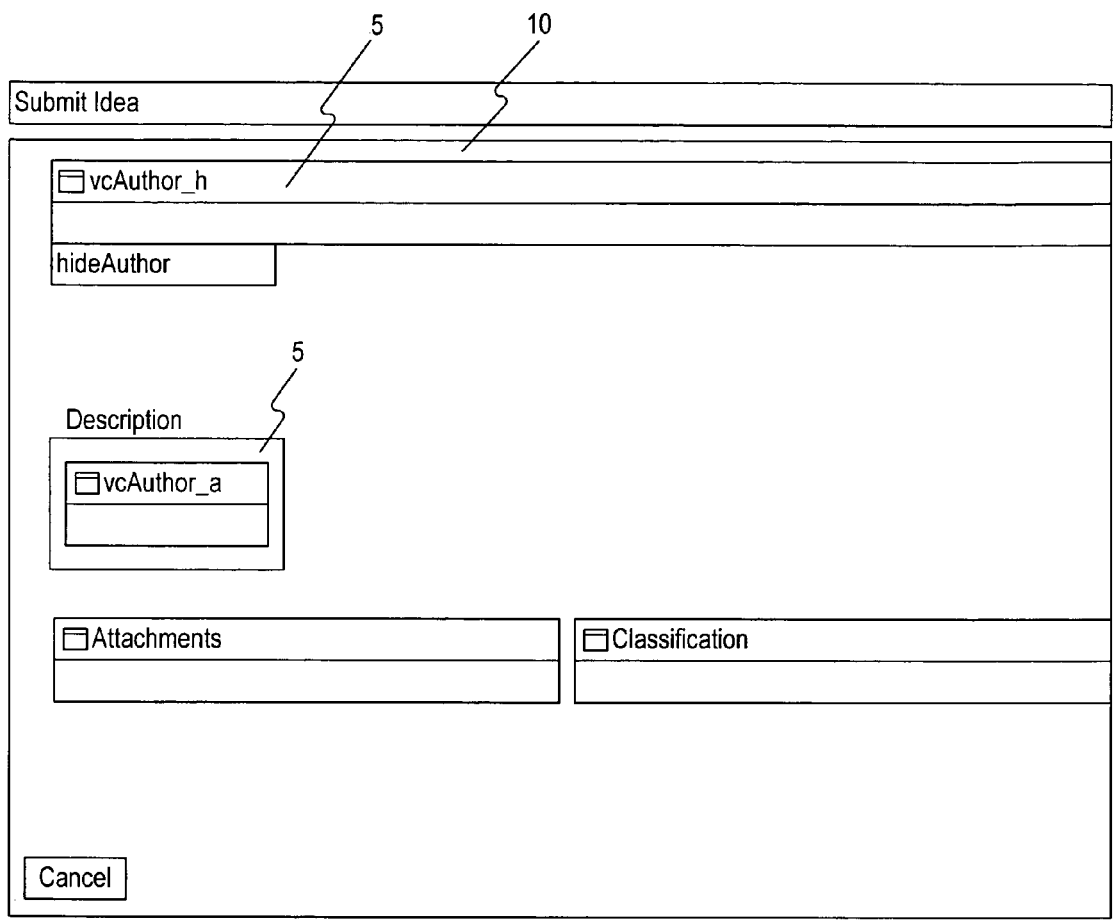
FIG. 2 is an example of semi-configured screen including configurable controls, consistent with an embodiment of the present invention.

FIG. 2 shows an example of a semi-configured screen 10 that is filled with containers 5 in application development time 1. An example of a development platform for this case is Web Dynpro. For every application user interface, at design time, the user interface is designed with containers that may store configuration data. Semi-configured screen 10 is generating the "submit Idea user interface" 11 illustrated in FIG. 4 and may be used to submit an idea of a user in a business software application. Since the user interface is only defined in terms of containers, the consultant may configure the "submit idea" semi configured screen 10 at implementation time.

Figure 3:
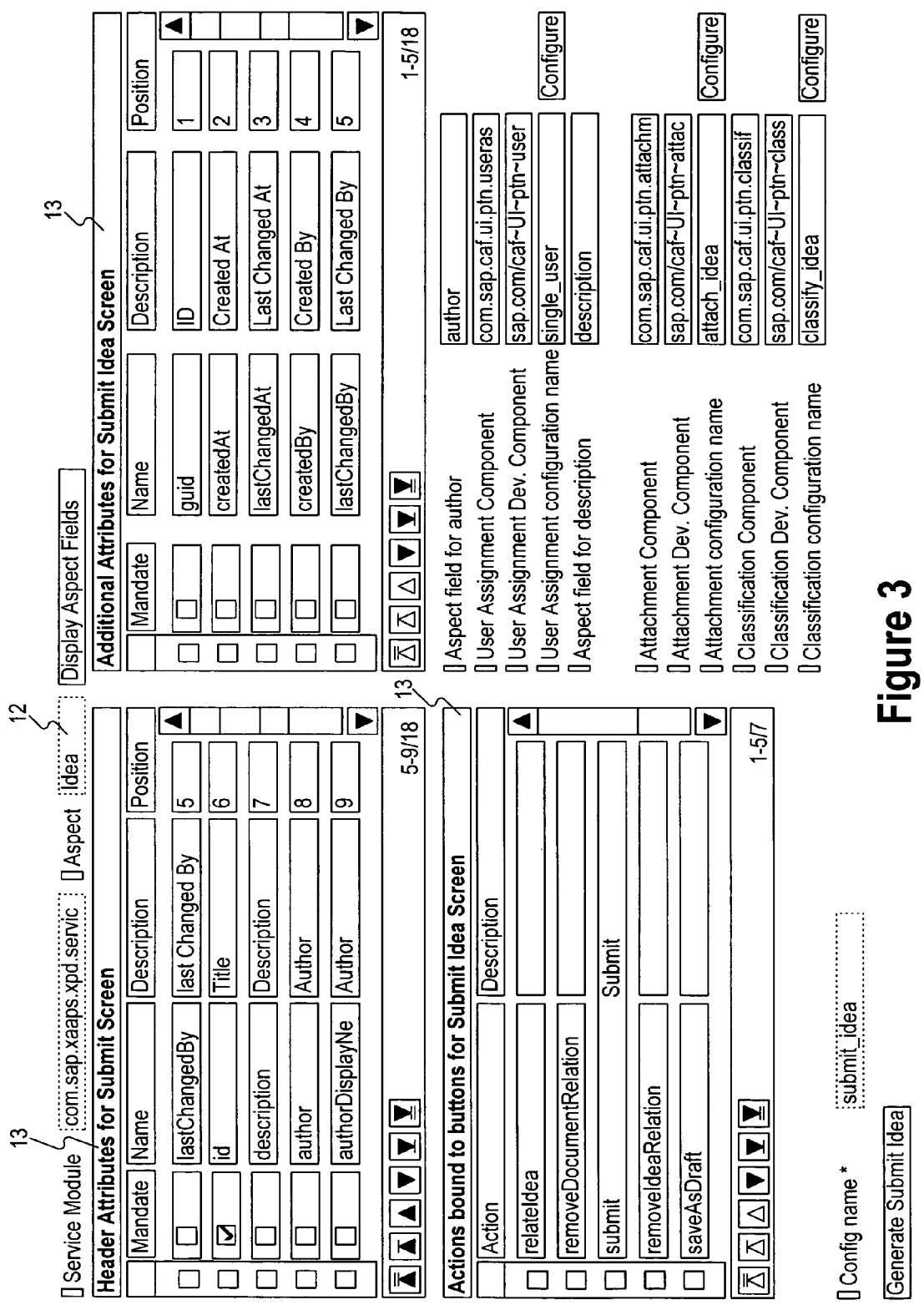
FIG. 3 shows how the semi-configured screen may be fully configured, according to embodiments of the present invention.

FIG. 3 illustrates how a consultant or other user launches a configuration screen 12 and configures the attributes to be displayed 13. For example, the consultant specifies the attributes that should be available in the header and what buttons should be available. This is accomplished by using the "doModify Method" to dynamically create user interface elements based on the configuration where the attributes of an object are exposed for selection. If all the containers are defined using the screen 11, the user interface is fully defined. In the application launch step 9, the interface is displayed, for example, on a client system that is connected a server system arranged to run software for generating the user interface using the input from screen 11. As is illustrated in FIG. 1, the screens 11 may be stored in a repository and may be retrieved while configuring the user interface.

The computational aspects described here can be implemented in digital electronic circuitry, or in computer hardware, firmware, software, or in combinations of them. Where appropriate, aspects of these systems and techniques can be implemented in a computer program product tangibly embodied in a machine-readable storage device for execution by a programmable processor, and method steps can be performed by a programmable processor executing a program of instructions to perform functions by operating on input data and generating output.

Embodiments of the invention may also be implemented in an article of manufacture with a computer usable medium having computer readable instructions embodied therein for providing access to resources available on that computer, the computer readable instructions comprising instructions to cause the computer to perform a part of methods consistent with the invention. Embodiments of the invention may also be implemented as a computer program for running on a computer system, at least including code portions for performing steps of methods consistent to the invention when run on a computer system or enabling a general propose computer system to perform functions of a filter device according to the invention. Such a computer program may be provided on a data carrier, such as a CD-ROM or diskette, stored with data loadable in a memory of a computer system, the data representing the computer program.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A method for generating a user interface for a computer system, comprising:

providing a generating tool for generating a user interface to the computer system using metadata of a predetermined format;

programming the generating tool to dynamically create the metadata of the predetermined format, wherein the metadata of the predetermined format is provided in semi-configured screens, which define user interface container elements that are configurable by the dynamically created metadata defining a form, a location, or a context of the user interface container elements;

developing a configurator user interface tool using the dynamically created metadata of the predetermined format in the semi-configured screens to create the user interface for the computer system, wherein the configurator user interface tool is developed independently of the user but at least the metadata associated with the user interface is modifiable according to user preferences, and wherein modifying the metadata associated with the user interface affects at least one attribute of the user interface when displayed on a screen; and configuring the semi-configured screens to a fully configured user interface by using the configurator user interface tool to dynamically create user interface elements based on the modified at least one attribute of the user interface.

2. The method according to claim 1, wherein the generating tool allows modification of the user interface after implementation of a program.

3. The method according to claim 1, wherein the generating tool is programmed using predetermined templates for instructing the generating tool to dynamically create the metadata.

4. The method according to claim 3, wherein the predetermined templates provide information as to a form, a location, or a context for a plurality of user interface control elements in a user interface generated by the generating tool.

5. The method according to claim 3, wherein the predetermined templates are stored in a repository and are retrieved when configuring the user interface.

6. The method according to claim 5, wherein the predetermined templates are accessible and configurable by an end-user.

7. A computer system, comprising:
a processor;
a generating tool configured to run on the processor for generating a user interface to the computer system;
a repository comprising metadata of a predetermined format that is used by the generating tool; and
a configuration tool for dynamically creating the metadata of the predetermined format used by the generating tool, wherein the metadata of the predetermined format is provided in semi-configured screens, which define user interface container elements that are configurable by dynamically created metadata defining a form, a location, or a context of the user interface container elements;
wherein the generating tool is used to develop a configurator user interface tool using the dynamically created metadata of the predetermined format in the semi-configured screens to create the user interface to the computer system, wherein the configurator user interface tool developed independently of the user but at least the metadata associated with the user interface is modifiable according to user preferences, and wherein modifying the metadata associated with the user interface affects at least one attribute of the user interface when displayed on a screen,
and wherein configuring the semi-configured screens to a fully configured user interface by using the configurator user interface tool to dynamically create user interface elements based on the modified at least one attribute of the user interface.

8. The computer system according to claim 7, further comprising:
a client system including the user interface; and
a server system connected to the client system, which executes the generating tool.

9. The computer system according to claim 8, wherein the client system is adapted to run the configuration tool.

10. A computer-readable storage medium comprising instructions tangibly embodied in the computer-readable storage medium which when executed on a processor, causes the processor to perform a method for generating a user interface to a computer system, the method comprising:
providing a generating tool for generating a user interface to the computer system using metadata of a predetermined format; and
programming the generating tool to dynamically create the metadata of the predetermined format, wherein the metadata of the predetermined format is provided in semi-configured screens, which define user interface container elements that are configurable by the dynamically created metadata defining a form, a location, or a context of the user interface container elements;
developing a configurator user interface tool using the dynamically created metadata of the predetermined format in the semi-configured screens to create the user interface for the computer system, wherein the configurator user interface tool is developed independently of the user but at least the metadata associated with the user interface is modifiable according to user preferences, and wherein modifying the metadata associated with the user interface affects at least one attribute of the user interface when displayed on a screen; and
configuring the semi-configured screens to a fully configured user interface by using the configurator user interface tool to dynamically create user interface elements based on the modified at least one attribute of the user interface.

11. The computer-readable storage medium comprising instructions according to claim 10, wherein the generating tool allows modification of the user interface after implementation of a program.

12. The computer-readable storage medium comprising instructions according to claim 10, wherein the generating tool is programmed using predetermined templates for instructing the generating tool to dynamically create the metadata.

13. The computer-readable storage medium comprising instructions according to claim 12, wherein the predetermined templates provide information as to a form, a location, or a context for a plurality of user interface control elements in a user interface generated by the generating tool.

14. The computer-readable storage medium comprising instructions according to claim 12, wherein the predetermined templates are stored in a repository and are retrieved when configuring the user interface.

15. The computer-readable storage medium comprising instructions according to claim 14, wherein the predetermined templates are accessible and configurable by an end-user.

* * * * *